United States Patent
Dieler et al.

(10) Patent No.: US 9,353,700 B2
(45) Date of Patent: May 31, 2016

(54) HYBRID DRIVE TRAIN, HYBRID VEHICLE, AND OPERATING METHOD

(75) Inventors: Torsten Dieler, Stuttgart (DE); Dirk Haase, Leutenbach (DE); Ruediger Herweg, Esslingen (DE); Gerd Kroener, Aspach-Grossaspach (DE); Friedemann Wolpers, Urbach (DE)

(73) Assignee: Daimler AG, Stuttgart (DE)

( * ) Notice: Subject to any disclaimer, the term of this patent is extended or adjusted under 35 U.S.C. 154(b) by 207 days.

(21) Appl. No.: 14/126,059

(22) PCT Filed: Dec. 15, 2011

(86) PCT No.: PCT/EP2011/006334
§ 371 (c)(1),
(2), (4) Date: Dec. 13, 2013

(87) PCT Pub. No.: WO2012/171546
PCT Pub. Date: Dec. 20, 2012

(65) Prior Publication Data
US 2014/0095050 A1    Apr. 3, 2014

(30) Foreign Application Priority Data
Jun. 16, 2011    (DE) .......................... 10 2011 104 422

(51) Int. Cl.
| | |
|---|---|
| *B60T 7/12* | (2006.01) |
| *F02D 43/04* | (2006.01) |
| *F02D 41/30* | (2006.01) |
| *F02D 13/02* | (2006.01) |

(Continued)

(52) U.S. Cl.
CPC ........... *F02D 43/04* (2013.01); *B60W 20/1082* (2013.01); *F02D 13/0207* (2013.01); *F02D 15/00* (2013.01); *F02D 41/3041* (2013.01); *B60W 2510/0657* (2013.01); *B60W 2710/083* (2013.01); *Y02T 10/18* (2013.01); *Y10S 903/902* (2013.01)

(58) Field of Classification Search
CPC ................................... F02D 41/00; F02B 3/06
USPC ............ 12/434, 478, 480, 294, 305; 123/434, 123/478, 480, 294, 305
See application file for complete search history.

(56) References Cited

U.S. PATENT DOCUMENTS

| | | |
|---|---|---|
| 7,539,562 B2 | 5/2009 | Maguire et al. |
| 7,748,481 B2 | 7/2010 | Holmes et al. |

(Continued)

FOREIGN PATENT DOCUMENTS

| | | |
|---|---|---|
| DE | 10 2007 016 551 A1 | 1/2008 |
| DE | 11 2007 000 515 T5 | 1/2009 |

(Continued)

OTHER PUBLICATIONS

International Search Report dated Mar. 21, 2012 w/ English translation (four (4) pages).

(Continued)

*Primary Examiner* — John Kwon
(74) *Attorney, Agent, or Firm* — Crowell & Moring LLP

(57) ABSTRACT

A method for operating a hybrid drive train involves operating an internal combustion engine using a low-NOx operating method in a range of low and average rotational speeds and/or loads, and operating the internal combustion engine using a spark ignition operating method in a range of higher rotational speeds and/or loads.

9 Claims, 1 Drawing Sheet

Figure 1:
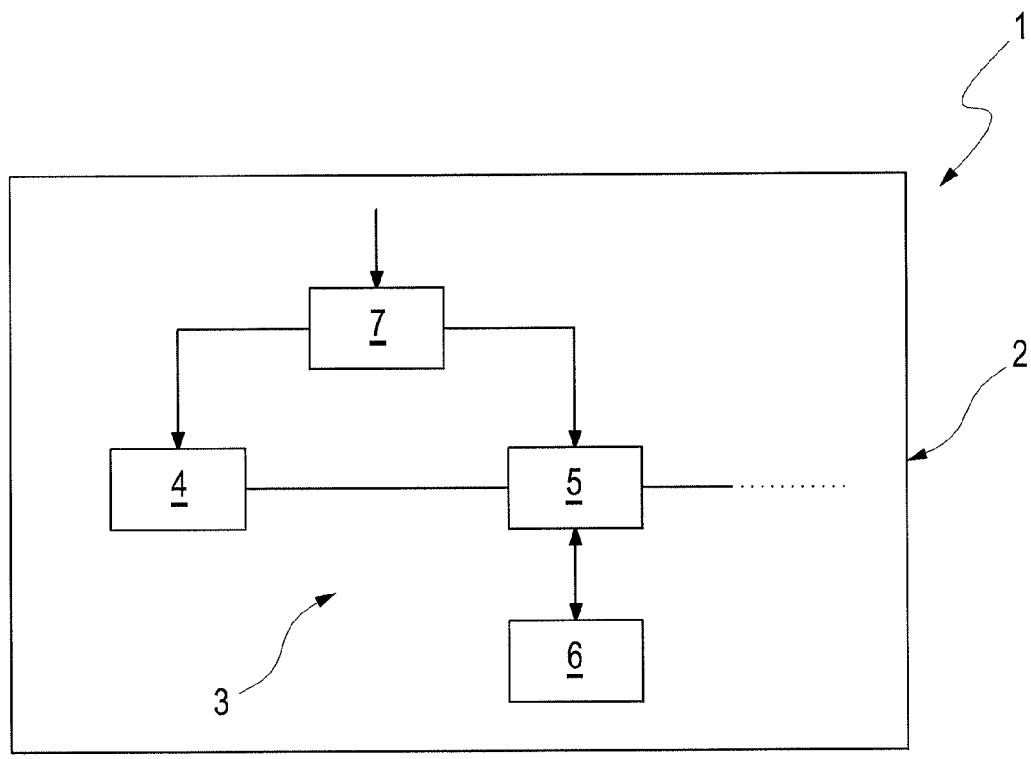

(51) Int. Cl.
*F02D 15/00* (2006.01)
*B60W 20/00* (2016.01)

(56) References Cited

U.S. PATENT DOCUMENTS

| | | | |
|---|---|---|---|
| 8,838,364 B2 * | 9/2014 | Nagatsu | F02B 23/101 123/294 |
| 2002/0059914 A1 | 5/2002 | Yamaguchi et al. | |
| 2003/0056752 A1 * | 3/2003 | Sukegawa | F02B 1/12 123/305 |
| 2003/0230441 A1 | 12/2003 | Teraji et al. | |
| 2005/0205058 A1 | 9/2005 | Juretzka et al. | |
| 2008/0254940 A1 | 10/2008 | Stoffels et al. | |
| 2014/0060493 A1 * | 3/2014 | Iwai | F02B 23/101 123/478 |
| 2014/0069382 A1 * | 3/2014 | Iwai | F02D 41/1446 123/406.47 |

FOREIGN PATENT DOCUMENTS

| | | |
|---|---|---|
| JP | 2000-265910 A | 9/2000 |
| JP | 2004-19587 A | 1/2004 |
| JP | 2008-261337 A | 10/2008 |
| WO | WO 2004/029428 A1 | 4/2004 |
| WO | WO 2009/033591 A2 | 3/2009 |

OTHER PUBLICATIONS

German-language Written Opinion (PCT/ISA/237) dated Mar. 21, 2012 (six (6) pages).
Japanese Notification of Reason for Refusal dated Feb. 24, 2015, with English translation (Five (5) pages).

* cited by examiner

HYBRID DRIVE TRAIN, HYBRID VEHICLE, AND OPERATING METHOD

BACKGROUND AND SUMMARY OF THE INVENTION

Exemplary embodiments of the present invention relate to a hybrid drive train, a hybrid vehicle having a hybrid drive train, and a method for operating a hybrid drive train.

A hybrid drive train includes at least one internal combustion engine and at least one electric motor. Both the engine and the motor are used for generating a drive power of the drive train, which may be utilized in a vehicle for generating propulsion.

German patent document DE 10 2007 016 551 A1 discloses a hybrid drive train having an internal combustion engine that may be operated in an auto-ignition operating process. The known hybrid drive train is operated in such a way that at low rotational speeds or loads the drive power is provided solely by the electric motor, whereas the internal combustion engine is switched off.

German patent document DE 11 2007 000 515 T5 discloses a method for controlling a hybrid drive train in which at least one set of route input data that include a starting point and an ending point of a preferred route of the hybrid vehicle is initially recorded. An optimal fuel-conserving route for reaching the ending point is subsequently determined on the basis of the at least one set of route input data. A drive train control strategy for achieving the optimal fuel-conserving route is then selected, the drive train control strategy including the determination of when the internal combustion engine and the electric motor are to be operated, and when a battery is to be charged. Lastly, the drive train control strategy is then carried out.

In internal combustion engines, a distinction is made among different combustion operating processes. Spark ignition operating processes operate using flame front combustion and are common in gasoline engines. Flame front combustion is initiated at an ignition point with the aid of an ignition device. The flame front spreads out spatially in the combustion chamber, starting from the ignition site. In contrast, auto-ignition operating processes basically function without an ignition device, and are generally characterized by charge compression combustion, in which the combustion reaction begins in the combustion chamber simultaneously at numerous spatially distributed locations. Auto-ignition operating processes are typical in diesel engines.

Whereas diesel engines are usually operated lean, in gasoline engines the mixture formation is generally stoichiometric. However, recent spark ignition operating processes for gasoline engines are known in which a lean mixture is likewise spark-ignited. For example, a lean mixture may be ignited via stratified charge in conjunction with direct injection.

Recent gasoline engines may likewise be intermittently operated in an auto-ignition operating process. A problem with gasoline engines is that these auto-ignition operating processes function reliably only at comparatively low rotational speeds and/or loads. At higher loads and/or rotational speeds, the auto-ignition operating processes are unstable and show a significant tendency toward knocking.

For stabilizing the auto-ignition operating processes, in gasoline engines it is possible in principle to initiate the charge compression combustion via spark ignition, as the result of which a desired ignition point may be achieved. By specifying the boundary conditions such as temperature and pressure, with the aid of spark ignition the framework necessary for reliable auto-ignition may be provided, so that the charge compression combustion may be directly triggered by means of the spark ignition.

Charge compression combustion has improved energy efficiency compared to flame front combustion.

Exemplary embodiments of the present invention are directed to an improved design, or at least a different design, for a hybrid drive train or a hybrid vehicle or associated operating method which is characterized by high energy efficiency.

The invention is based on the general concept of operating the internal combustion engine of the hybrid drive train in the range of lower and average rotational speeds and/or loads using a low-NOx operating method that is based on charge compression combustion, and in a range of higher loads, to operate in a spark ignition operating method that is based on flame front combustion. The low-NOx operating method is characterized in that a homogeneous lean mixture composed of air and fuel and optionally recirculated exhaust gas is spark-ignited at an ignition point by means of an ignition device in order to initiate a flame front combustion, the flame front combustion in turn initiating a charge compression combustion. Thus, in the low-NOx operating method the charge compression combustion is triggered twice: first by spark ignition by means of the ignition device, thus initiating the flame front combustion, and second by flame front combustion, which initiates the charge compression combustion. To be able to trigger the flame front combustion by means of spark ignition, the flame front combustion in turn triggering the charge compression combustion, the boundary conditions necessary for this purpose, such as temperature and pressure, must be provided in the particular combustion chamber, which in recent internal combustion engines is achievable using suitable measures.

The low-NOx operation of the internal combustion engine is characterized by comparatively high energy efficiency with low pollutant emissions, namely, low NOx emissions. However, the power output of the internal combustion engine in low-NOx operation is limited. For higher power, a change is made to spark-ignition operation, in which a homogeneous stoichiometric mixture composed of air and fuel and optionally recirculated exhaust gas is spark-ignited at the particular ignition point in order to trigger flame front combustion, which in contrast to the low-NOx operating method does not change over to charge compression combustion. For this purpose, the necessary boundary conditions such as pressure and/or temperature are provided in the particular combustion chamber, using suitable measures. The spark ignition operating method is characterized by a higher power output. However, less favorable efficiency and pollutant emissions must be accepted.

The operation of the hybrid drive train is advantageously carried out primarily in the low-NOx operating method, in which the electric motor in question may provide power assistance.

In one particularly advantageous embodiment a compression ratio is reduced for changing from the low-NOx operating method to the spark ignition operating method. In an internal combustion engine designed as a reciprocating engine, the compression ratio is understood to mean the ratio of the entire combustion chamber prior to the compression to the remaining space after the compression. Accordingly, the compression ratio is computed as the quotient of the compression volume (remaining space after the compression) and the sum of the displacement volume (difference between the volume prior to the compression and the volume after the compression) and the compression volume (volume after the compression).

For a high compression ratio, the energy-efficient low-NOx operating method may be implemented based on charge compression combustion. However, specifically because of the high compression ratio, the low-NOx operating method is limited to lower power levels, since instability such as knocking occurs at higher power levels. In contrast, reducing the compression ratio results in the range of customary spark-ignited flame front combustion, which is stable even at high loads but has reduced efficiency. An internal combustion engine in which the compression ratio is adjustable may be equipped with an appropriate device for changing the compression ratio. For example, the piston stroke may be variable.

In another advantageous embodiment, lifts of gas exchange valves may be increased with regard to amplitude and/or opening duration in order to change from the low-NOx operating method to the spark ignition operating method. To be able to provide boundary conditions in the particular combustion chamber that are suitable for the low-NOx operating method or for the spark ignition operating method, it may be necessary to control the gas exchange valves differently, in particular to change the lifts with regard to amplitude and/or opening time duration. For example, based on lifts of the gas exchange valves that are suitable for spark-ignition operation, it may be necessary to decrease the lifts with regard to amplitude and opening time duration in order to provide boundary conditions which are suitable for the low-NOx operation.

An internal combustion engine in which the lifts of the gas exchange valves are variable may be equipped, for example, with a device for adjusting the lifts of the gas exchange valves with regard to amplitude and/or opening time duration.

According to one particularly advantageous embodiment the internal combustion engine is operated in a quasi-steady-state mode in the range of low and average rotational speeds and/or power levels. The steady-state or quasi-steady-state operation of the internal combustion engine at varying low and average rotational speeds and/or loads is characterized in that, despite varying rotational speeds and/or loads, the particular operating point of the internal combustion engine is not varied or is varied only comparatively very little, so that the internal combustion engine is operated in quasi-steady-state mode in the operating point in question. In particular, in this quasi-steady-state operation of the internal combustion engine, only comparatively small sub-ranges for rotational speed and/or load are settable. The term "small" encompasses variations of 20% maximum, preferably maximal 10% maximum, of the maximum bandwidth of the particular range for the rotational speeds or for the loads. It is thus possible to always operate the internal combustion engine in a fuel-optimized operating state within the range having low and average rotational speeds and/or loads, as the result of which the internal combustion engine has particularly high energy efficiency.

If the required setpoint load exceeds the actual load achieved in steady-state operation of the internal combustion engine, the setpoint/actual difference may be provided by the at least one electric motor. The electric motor in question is supplied with power from a battery of the hybrid drive.

On the other hand, if the required setpoint load is below the actual load achieved by the internal combustion engine in steady-state operation, the setpoint/actual difference is decreased by the at least one electric motor, which in this case is operated as an electrical generator. It is thus possible, for example, to recharge the above-mentioned battery.

Furthermore, the situation may arise that the required setpoint load exceeds the actual load of the internal combustion engine in steady-state operation, and that in addition the setpoint/actual difference exceeds the maximum power of the at least one electric motor. In this case, a change is made from the steady-state operation of the low-NOx operating method to the spark ignition operating method; the internal combustion engine may then be dynamically operated in the spark ignition operating method. Due to the dynamic operation of the internal combustion engine in the spark ignition operating method, the internal combustion engine may be quickly adapted to changing rotational speeds and loads. The electric motor in question may also provide power assistance at these high loads and rotational speeds.

A hybrid drive train according to the invention includes the internal combustion engine and at least one electric motor, as well as a battery. In addition, the hybrid drive train includes a control system which is configured and/or programmed in such a way that it may carry out the above-described operating method.

A hybrid vehicle according to the invention, which may preferably be an on-road vehicle, includes a chassis, in particular a body or vehicle structure, in which a hybrid drive train of the above-described type is situated.

Further important features and advantages of the invention result from the drawings, and from the associated description of the figures with reference to the drawings.

It is understood that the features stated above and to be explained below may be used not only in the particular stated combination, but also in other combinations or alone without departing from the scope of the present invention.

Preferred exemplary embodiments of the invention are illustrated in the drawings and explained in greater detail in the following description; similar or functionally equivalent components are denoted by the same reference numerals.

BRIEF DESCRIPTION OF THE DRAWING FIGURES

Figure 2:
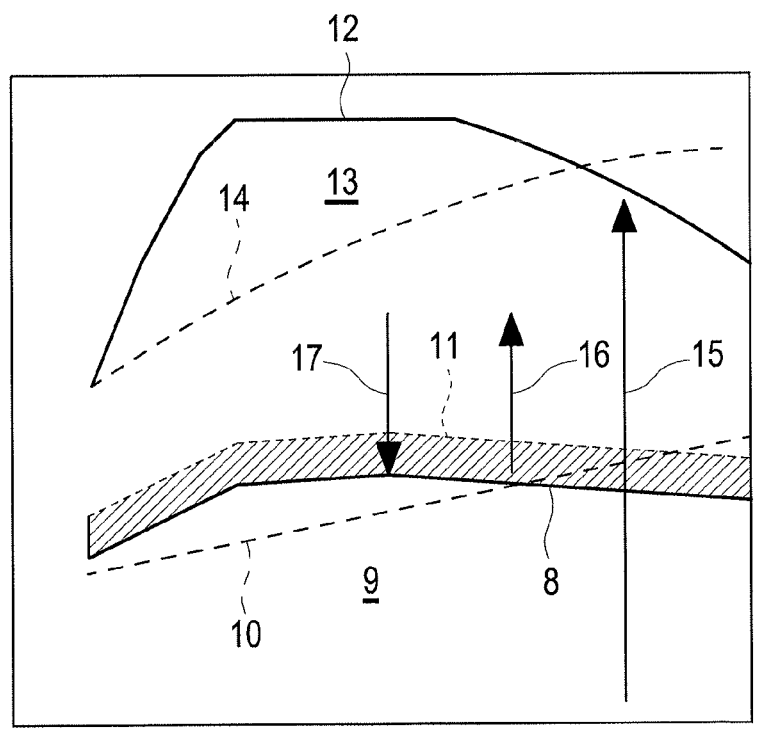

The drawings schematically show the following:

FIG. 1 shows a greatly simplified, wiring diagram-like schematic illustration of a hybrid vehicle having a hybrid drive train, and FIG. 2 shows a load/rotational speed diagram for illustrating an operating method for the hybrid drive train.

DETAILED DESCRIPTION

FIG. 1 illustrates a hybrid vehicle 1, which is preferably an on-road vehicle that includes a chassis 2 and a hybrid drive train 3. It is clear that for the case that the vehicle 1 is an on-road vehicle, the chassis 2 is also equipped with wheels and the like.

The hybrid drive 3 includes at least one internal combustion engine 4 and at least one electric motor 5, as well as at least one battery 6 that is appropriately connected to the at least one electric motor 5. The series arrangement of the internal combustion engine 4 and the electric motor 5 shown by way of example in FIG. 1 may also be replaced by a parallel arrangement or any other given arrangement. In particular, the electric motor 5 may also be designed as a hub motor, which may be situated directly at a drive wheel of the vehicle 1.

The hybrid drive train 3 also includes a control system 7 that controls the internal combustion engine 4 and the electric motor 5 as a function of incoming signals. The control system 7 may advantageously be configured in such a way that it may carry out the operating method explained below in conjunction with the diagram shown in FIG. 2.

The diagram shown in FIG. 2 depicts the rotational speed on the abscissa and the load on the ordinate, the rotational speed and the load being achievable using the internal combustion engine 4. A curve 8 depicts a torque curve that is achievable using a low-NOx operating method. The loads that are achievable in this way are thus present beneath this curve 8. The range associated with the low-NOx operating method is denoted by reference numeral 9 in FIG. 2. A dashed line indicates a curve 10 which depicts the power that is achievable in the range 9 of the low-NOx operating method.

Above the torque curve 8 and parallel thereto, a dashed line represents a parallel torque curve 11 depicting a limit range, which is essentially correlated with a knock limit.

FIG. 2 also illustrates a curve 12 depicting the torque curve of the internal combustion engine 4 in a spark ignition operating method. The spark ignition operating method is present beneath this torque curve 12 and above the torque curves 8, 11 of the low-NOx operating method. The associated range is denoted by reference numeral 13 in FIG. 2. A power curve 14 reflecting the achievable power of the internal combustion engine 4 in the spark ignition operating method is also associated with this range 13 using the spark ignition operating method. It is apparent that the two operating methods, namely, the low-NOx operating method of the range 9 on the one hand and the spark ignition operating method of the range 13 on the other hand, are characterized by significantly different torque curves 8, 11 and 12, respectively, and by different power curves 10 and 14, respectively.

An arrow 15 indicates a reduction in the compression ratio in the particular combustion chamber in order to go from the range 9 of the low-NOx operating method to the range 13 of the spark ignition operating method. An arrow 16 indicates a change from the low-NOx operating method to the spark ignition operating method. An arrow 17 indicates a change from the spark ignition operating method to the low-NOx operating method.

If the required power or the required load is present in the range 9 of low and average rotational speeds or loads, the internal combustion engine 4 is operated using the low-NOx operating method. In this case, a homogeneous fuel-air mixture or a homogeneous fuel-exhaust gas-air mixture having a combustion ratio of $\lambda > 1$ is spark-ignited in the particular combustion chamber of the internal combustion engine 4 at a predefined ignition point by means of an ignition device; as a result of this spark ignition, a flame front combustion is initiated, which in turn initiates a charge compression combustion or changes over to a charge compression combustion.

However, if higher rotational speeds and/or loads or power levels are required which are present in the range 13, the internal combustion engine 4 is operated in the spark ignition operating method, in which a homogeneous fuel-air mixture or a homogeneous fuel-exhaust gas-air mixture having a combustion ratio of $\lambda = 1$ is spark-ignited in the particular combustion chamber of the internal combustion engine 4 at the particular ignition point by means of the ignition device; as a result of the spark ignition, a flame front combustion is initiated which does not change over to a charge compression combustion.

During the low-NOx operating method, i.e., the low-NOx combustion, combustion thus prevails which is based on charge compression combustion. In contrast, during the spark ignition operating method, combustion is present which is based on flame front combustion.

In order to now change from the low-NOx operating method according to the arrow 16 to the spark ignition operating method, the control system 7 may reduce the compression ratio according to the arrow 15. At the same time, the control system 7 may increase the lifts of gas exchange valves with regard to amplitude and/or opening duration. The boundary conditions which are necessary for implementing the spark ignition operating method are provided in this way.

Conversely, to change from the spark ignition operating method to the low-NOx operating method according to the arrow 17, the compression ratio is correspondingly increased, and the lifts of the gas exchange valves are correspondingly decreased with regard to amplitude and/or opening duration in order to provide the boundary conditions for the low-NOx operating method.

The internal combustion engine 4 is operated in quasi-steady-state mode in the range 9 of the low and/or average rotational speeds or loads. Within this range 9, the internal combustion engine 4 varies only in comparatively small sub-ranges with regard to rotational speed and/or load. The quasi-steady-state operation of the internal combustion engine 4 is achieved in this range 9 with optimized fuel consumption.

If the required setpoint load during the low-NOx operating method exceeds the actual load instantaneously achieved by the internal combustion engine 4 in the stated steady-state operation, the setpoint/actual difference is supplied or compensated for by the at least one electric motor 5. In this regard, the electric motor 5 in question is supplied with power from the battery 6.

On the other hand, if the required setpoint load during the low-NOx operating method exceeds the actual load of the internal combustion engine 4 during steady-state operation, the setpoint/actual difference is decreased by the electric motor 5, which is operated as an electrical generator. The electricity thus obtained may be used for charging the battery 6.

A change from the low-NOx operating method to the spark ignition operating method takes place when the required setpoint load exceeds the actual load of the internal combustion engine during steady-state operation, and when, in addition, the setpoint/actual difference exceeds the maximum power of the at least one electric motor 5. The internal combustion engine 4 is dynamically operated in the range 13 in which the spark ignition operating method is carried out, so that the internal combustion engine may be tracked over large ranges of load changes and rotational speed changes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating a hybrid drive train that includes at least one electric motor and at least one internal combustion engine, the method comprising:
    operating the internal combustion engine using a low-NOx operating method in a first range of low to average operating characteristics including at least one of a rotational or speed and a load, wherein in the low-NOx operating method at least one of a homogeneous fuel-air mixture and a fuel-exhaust gas-air mixture having a combustion ratio of $\lambda > 1$ is spark-ignited in a combustion chamber of the internal combustion engine at an ignition point by an ignition device, and wherein a flame front combustion that is initiated by the spark ignition changes over to a charge compression combustion; and operating the internal combustion engine using a spark ignition operating method in a second range of operating characteristics including at least one of the rotational speed and the load that is higher than the at least one of the rotational speed and the load of the first range, wherein in the spark ignition operation method at least one of the homogeneous fuel-air mixture and the fuel-exhaust gas-air mixture having a combustion ratio of $\lambda=1$ is spark-ignited in the combustion chamber of the internal combustion engine at the ignition point by the ignition device, and wherein the flame front combustion initiated by the spark ignition does not change over to the charge compression combustion.

2. The method according to claim 1, wherein a compression ratio is reduced for changing from the low-NOx operating method to the spark ignition operating method.

3. The method according to claim 1, wherein lifts of gas exchange valves are increased with regard to amplitude or opening duration for changing from the low-NOx operating method to the spark ignition operating method.

4. The method according to claim 1, wherein the internal combustion engine is operated in a quasi-steady-state mode in the first range, so that only comparatively small sub-ranges for the at least one of the rotational speed and the load are settable for the internal combustion engine within the first range.

5. The method according to claim 4, wherein when a required setpoint load exceeds an actual load of the internal combustion engine in steady-state operation, a difference between the setpoint and actual loads is provided by the at least one electric motor.

6. The method according to claim 4, wherein when a required setpoint load is below an actual load of the internal combustion engine in steady-state operation, a difference between the setpoint and actual loads is decreased by the at least one electric motor, which is operated as an electrical generator.

7. The method according to claim 4, wherein when a required setpoint load exceeds an actual load of the internal combustion engine in steady-state operation and a difference between the setpoint and actual loads exceeds a maximum power of the at least one electric motor, a change is made from the low-NOx operating method to the spark ignition operating method and the internal combustion engine is operated in a dynamic manner in the spark ignition operating method.

8. A hybrid drive train of a vehicle, comprising:
at least one internal combustion engine;
at least one electric motor; and
a control system configured to control the at least one internal combustion engine by
   operating the internal combustion engine using a low-NOx operating method in a first range of low to average operating characteristics including at least one of a rotational speed and a load, wherein in the low-NOx operating method at least one of a homogeneous fuel-air mixture and a fuel-exhaust gas-air mixture having a combustion ratio of $\lambda>1$ is spark-ignited in a combustion chamber of the internal combustion engine at an ignition point by an ignition device, and wherein a flame front combustion that is initiated by the spark ignition changes over to a charge compression combustion; and
   operating the internal combustion engine using a spark ignition operating method in a second range of operating characteristics including at least one of the rotational speed and the load that is higher than the at least one of the rotational speed and the load of the first range, wherein in the spark ignition operation method at least one of the homogeneous fuel-air mixture and the fuel-exhaust gas-air mixture having a combustion ratio of $\lambda=1$ is spark-ignited in the combustion chamber of the internal combustion engine at the ignition point by the ignition device, and wherein the flame front combustion initiated by the spark ignition does not change over to the charge compression combustion.

9. A hybrid vehicle, comprising:
a chassis; and
a hybrid drive train that includes at least one internal combustion engine, at least one electric motor, and a control system configured to control the at least one internal combustion engine by
   operating the internal combustion engine using a low-NOx operating method in a first range of low to average operating characteristics including at least one of a rotational speed and a load, wherein in the low-NOx operating method at least one of a homogeneous fuel-air mixture and a fuel-exhaust gas-air mixture having a combustion ratio of $\lambda>1$ is spark-ignited in a combustion chamber of the internal combustion engine at an ignition point by an ignition device, and wherein a flame front combustion that is initiated by the spark ignition changes over to a charge compression combustion; and
operating the internal combustion engine using a spark ignition operating method in a second range of operating characteristics including at least one of the rotational speed and the load that is higher than the at least one of the rotational speed and the load of the first range, wherein in the spark ignition operation method at least one of the homogeneous fuel-air mixture and the fuel-exhaust gas-air mixture having a combustion ratio of $\lambda=1$ is spark-ignited in the combustion chamber of the internal combustion engine at the ignition point by the ignition device, and wherein the flame front combustion initiated by the spark ignition does not change over to the charge compression combustion.

* * * * *